No. 616,128. Patented Dec. 20, 1898.
F. T. MOODY.
SEALED PIPE COUPLING.
(Application filed Feb. 7, 1898.)
(No Model.)
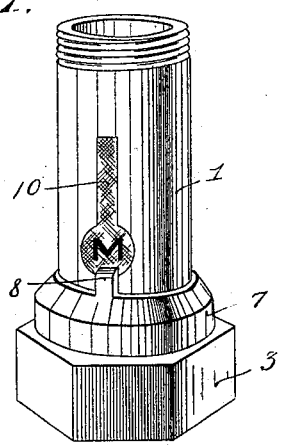
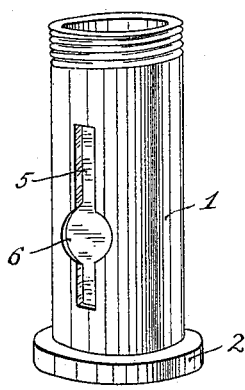
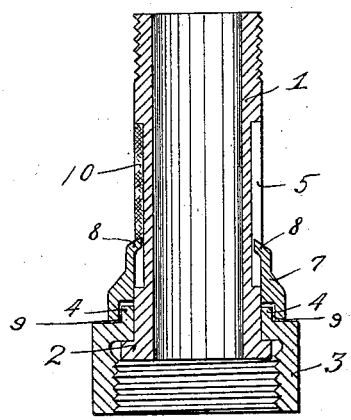
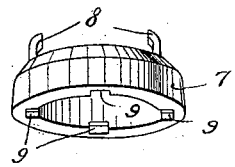
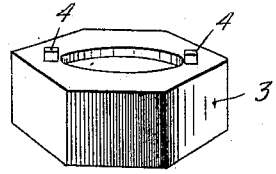
Witnesses.
C. F. Kilgore
F. D. Merchant
Inventor.
Frank T. Moody.
By his Attorney,
Jas. F. Williamson

UNITED STATES PATENT OFFICE.

FRANK T. MOODY, OF MINNEAPOLIS, MINNESOTA.

SEALED PIPE-COUPLING.

SPECIFICATION forming part of Letters Patent No. 616,128, dated December 20, 1898.

Application filed February 7, 1898. Serial No. 669,349. (No model.)

*To all whom it may concern:*

Be it known that I, FRANK T. MOODY, a citizen of the United States, residing at Minneapolis, in the county of Hennepin and State of Minnesota, have invented certain new and useful Improvements in Sealed Pipe-Couplings; and I do hereby declare the following to be a full, clear, and exact description of the invention, such as will enable others skilled in the art to which it appertains to make and use the same.

My invention has for its principal object to provide a pipe-coupling with means whereby the coupling-section or union may be locked or sealed to prevent tampering therewith.

To this end my invention consists of the novel devices and combinations of devices hereinafter described, and defined in the claims.

The preferred form of my invention is illustrated in the accompanying drawings, wherein like numerals indicate like parts throughout the several views.

Figure 1 is a perspective view of one section of a pipe, the same being provided with an ordinary rotatable coupling-section or union and with my improved locking and sealing attachment. Fig. 2 is a central longitudinal section through the parts shown in Fig. 1. Fig. 3 is a perspective view of the pipe-section. Fig. 4 is a perspective view of the locking device or sliding section, and Fig. 5 is a perspective view of the coupling-section or union.

The pipe-section 1 is provided at its end which is to be connected by the union or coupling with an outturned annular flange 2. The union or coupling connection 3 is in the form of an internal nut which is rotatively mounted on the pipe-section 1 and works against the annular collar 2. This much of the construction is standard or ordinary.

In accordance with my invention as exemplified in the illustrations herewith given I provide the coupling-section or union 3 on its rear face with one or more (as shown two) projecting lugs 4, for a purpose that will presently appear.

The pipe-section 1 is provided at diametrically opposite points with longitudinally-extended grooves or channels 5, one of which is provided with an expanded portion 6, the sides of which are dovetailed or flared inward, so as to retain the sealing material, as will be presently noted.

7 indicates a ring or annular locking-section which is mounted with freedom for sliding movements on the pipe-section 1 and is provided with a pair of lugs or tongues 8, that work one in each of the grooves or channels 5, and thus prevent said ring or locking-section from rotating on the said pipe-section. In the particular construction shown there are two of these lugs or fingers 8, and they are adapted to be bent into engagement with the coöperating grooves 5 after said ring or locking-section 7 has been slipped onto the pipe-section 1. In its outer face or edge this ring or locking-section 7 is provided with a multiplicity of detents or lug-seats 9, adapted to receive the lugs 4 of the union or coupling 3. As shown in the illustration, there are four of these detents or lug-seats 9, the same being arranged in diametrically opposite pairs to correspond to the relative position of the lugs 4.

It is of course understood that the union or coupling-section 3 works on the screw-threaded end of the pipe-section which is to be connected to the pipe-section 1 and that the connection or disconnection of the said sections can be effected only by turning or rotating the said union or section 3. When the locking-section or ring 7 is drawn backward on the pipe-section 1, the said union or section 3 will be free to turn or rotate. However, when after the pipe-sections have been connected by the union or coupling-section 3 the locking-ring 7 is forced or moved outward until its detents or notches 9 engage the lugs 4 the said union or section 3 will be locked and held against rotation. Now by placing sealing-wax or other suitable sealing material 10 within the seat 6 and preferably also in the groove 5 which leads therefrom the locking-ring 7 will be held so that it cannot be slid backward on the pipe-section 1 to release the union or coupling-section 3 without breaking or destroying the seal. Under these conditions the coupling or connection between the pipe-sections is locked and sealed.

A coupling of this character will find many important uses. It has been designed particularly for use in connecting water and gas meters to the mains or branches therefrom to prevent tampering with the meters by persons unauthorized. Without some such device as this it is possible to disconnect the meters, and thus cheat the company or corporation supplying the water or gas, as the case may be, either by causing the meter to stand idle or by connecting it up and running it backward while the water or gas is being used. As is obvious, my improved device will effectually stop all such frauds.

The person authorized to seal the coupling would usually employ a sealing-stamp of some peculiar design which could not be easily secured by the users of the meters.

In Fig. 1 the letter M indicates the symbol used in sealing the device; but of course in practice it would be something more elaborate.

By reference to Fig. 2 it will be noted that the edge of the lug or finger 8 which engages the seal 10 projects under or is dovetailed into the sealing material, so that it could not be again bent outward without destroying the seal.

It will of course be understood that my improved coupling is capable of a large range of variation or modification and that the details of construction above specifically described may be changed and altered in many respects, all within the scope of my invention. It will also be understood that the coupling is capable of use not only as a pipe-coupling, but as a means for connecting rods or bars as well.

What I claim, and desire to secure by Letters Patent of the United States, is as follows:

1. The combination with a pipe or rod, of a coupling-section or union rotatable thereon, and a slidable non-rotary locking-section, engageable with said coupling-section or union, to lock the same against rotation, substantially as described.

2. The combination with a pipe or rod, of a coupling-section or union rotatable thereon, a slidable non-rotary lock-section on said pipe or rod, having interlocked engagement with said coupling or union, thereby holding the same against rotation, and means for securing said lock-section against sliding movement, substantially as described.

3. The combination with a pipe or rod, of a coupling-section or union rotatable thereon, a slidable non-rotary locking-section on said pipe or rod, having interlocked engagement with said coupling-section or union, thereby locking the same against rotation, and a seal securing said locking-section against sliding movement, substantially as described.

4. The combination with a pipe or rod, provided with one or more longitudinal grooves, of a coupling-section or union rotatable thereon, a sliding locking-section on said pipe or rod, provided with one or more lugs working in said groove or grooves, and having interlocked engagement with said coupling-section or union, and a seal or sealing material secured in the path of the lug of said locking-section and sealing the device, substantially as described.

In testimony whereof I affix my signature in presence of two witnesses.

FRANK T. MOODY.

Witnesses:
BESSIE B. NELSON,
F. D. MERCHANT.